United States Patent
Balan et al.

(10) Patent No.: US 9,644,348 B2
(45) Date of Patent: May 9, 2017

(54) GROUND ENGAGING TOOTH ASSEMBLIES

(71) Applicant: CATERPILLAR INC., Peoria, IL (US)

(72) Inventors: Mihai M. Balan, Dunlap, IL (US);
Douglas Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/824,655

(22) Filed: Aug. 12, 2015

(65) Prior Publication Data

US 2017/0044743 A1     Feb. 16, 2017

(51) Int. Cl.
| | | |
|---|---|---|
| *E02F 9/28* | (2006.01) | |
| *G05B 19/4099* | (2006.01) | |
| *B29C 67/00* | (2017.01) | |
| *B33Y 50/02* | (2015.01) | |

(52) U.S. Cl.
CPC ........ *E02F 9/2883* (2013.01); *B29C 67/0088* (2013.01); *E02F 9/2833* (2013.01); *E02F 9/2858* (2013.01); *G05B 19/4099* (2013.01); *B33Y 50/02* (2014.12); *G05B 2219/35134* (2013.01); *G05B 2219/49007* (2013.01)

(58) Field of Classification Search
CPC ..... E02F 9/2825; E02F 9/2828; E02F 9/2833; E02F 9/2841; E02F 9/2883; E02F 9/2858; G05B 19/4099; G05B 2019/35134; G05B 2019/49007; B29C 67/0088; B23Y 50/02
USPC ..... 37/446, 452–460; 172/701.1–701.3, 713, 172/719, 772.5, 699, 770, 771
See application file for complete search history.

(56) References Cited

U.S. PATENT DOCUMENTS

| | | | | |
|---|---|---|---|---|
| 3,805,423 | A * | 4/1974 | Engel ...................... | E02F 9/285 |
| | | | | 172/719 |
| 5,188,680 | A * | 2/1993 | Hahn ...................... | B23P 15/00 |
| | | | | 148/593 |
| D385,286 | S * | 10/1997 | Moreno ........................ | D15/139 |
| 6,490,816 | B2 * | 12/2002 | Ketting ................. | E02F 9/2858 |
| | | | | 172/753 |
| D600,723 | S * | 9/2009 | Bartolome ..................... | D15/29 |
| 7,818,902 | B2 * | 10/2010 | Launder ................ | E02F 9/2858 |
| | | | | 37/452 |
| 8,191,291 | B2 * | 6/2012 | Vanderpoorten ..... | E02F 9/2858 |
| | | | | 37/453 |
| 8,943,717 | B2 | 2/2015 | Renski et al. | |
| 2013/0086827 | A1 * | 4/2013 | Renski .................. | E02F 9/2825 |
| | | | | 37/452 |

* cited by examiner

*Primary Examiner* — Robert Pezzuto
(74) *Attorney, Agent, or Firm* — Finnegan, Henderson, Farabow, Garrett & Dunner, LLP

(57) ABSTRACT

A ground engaging tip may include a rear edge including upper and lower rear edges. The ground engaging tip may also include a front edge opposite the rear edge. The ground engaging tip may further include a top outer surface extending from the upper rear edge toward the front edge, and a bottom outer surface extending from the lower rear edge toward the front edge. The bottom outer surface may include a bottom surface front portion extending from the front edge toward the lower rear edge and terminating at a bottom surface transition portion, and a bottom surface rear portion extending from the transition portion toward the lower rear edge. The bottom surface front portion and rear portions may include respective front and rear portion surfaces extending in respective first and second directions defining an angle, such that the bottom surface rear portion extends toward the top outer surface.

28 Claims, 7 Drawing Sheets

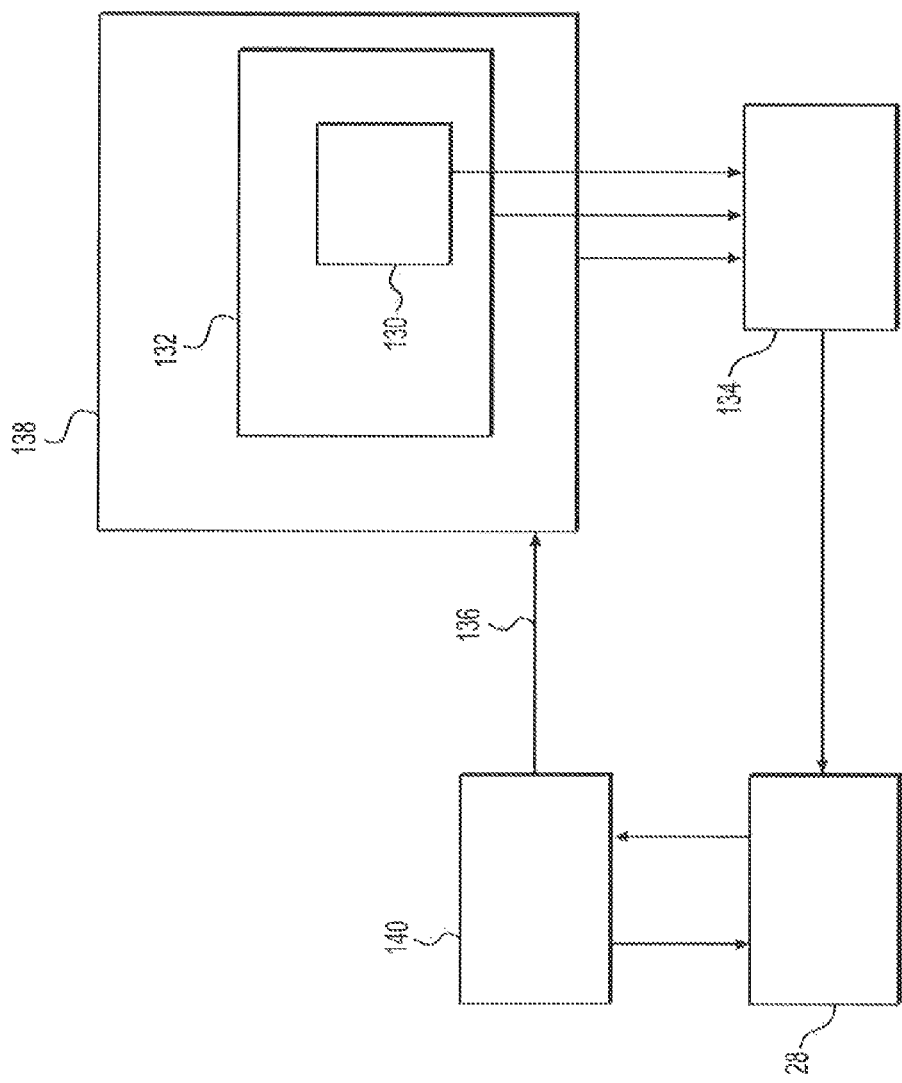

GROUND ENGAGING TOOTH ASSEMBLIES

TECHNICAL FIELD

The present disclosure relates to ground engaging tooth assemblies, and more particularly, to ground engaging tooth assemblies including adapters configured to be coupled to an edge of a ground engaging implement, and ground engaging tips configured to be coupled to a respective adapter.

BACKGROUND

Machines may be used to dig into a work material such as earth or rock and move loosened work material from one place to another at a worksite. Such machines typically include a chassis housing a power source and one or more mechanical linkages for controlling movement and operation of implements for performing tasks such as excavating and transferring the work material. The linkages may be capable of raising and lowering the implements, and rotating the implements to engage the work material in a desired manner. For example, in the earth moving applications, the implements of the machine may include a bucket having an edge for penetrating into the surface of the work material and excavating it.

To facilitate the earth moving process and prolong the useful life of the implement, a plurality of tooth assemblies may be spaced along and attached to the base edge of the implement. The tooth assemblies project forward from the base edge and act as a first point of contact to penetrate the work material, which may reduce the amount of wear of the base edge of the implement. In this manner, the implement may remain usable through multiple cycles of replacement tooth assemblies. However, it may be desirable to replace the tooth assemblies because they are subjected to wear and are sometimes damaged by repetitive engagement with the work material. Depending on the uses of the implement and/or the characteristics of the work material, it may also be desirable to change the tooth assemblies to provide tooth assemblies having a shape or other characteristic consistent with the desired use and/or work material to effectively use the implement.

During use of ground engaging implements, and depending on the use, the bottom portion of a tooth assembly may be subjected to relatively more abrasion than other portions of the ground engaging tooth assembly. For example, as the ground engaging implement is pulled in a reverse direction through a work material, the material wears against the bottom surface of the tooth assembly. In addition, when the ground engaging implement dragged while against the ground or other surface, the wear on the bottom surface of the tooth assembly may be greater than for other portions of the tooth assembly.

As a result, it may be desirable to provide a ground engaging tooth assembly that is relatively more abrasion-resistant when being pulled backwards through a work material. In addition, it may be desirable to provide a ground engaging tooth assembly that is relatively more wear resistant when dragged backwards against a surface. It may also be desirable to provide a ground engaging tip that substantially maintains its sharpness as it wears from use.

An example of an implement tooth assembly is disclosed in U.S. Pat. No. 8,943,717 B2 to Renski et al. ("the '717 patent"). In particular, the '717 patent discloses a ground engaging tip of a tooth assembly for a base edge of a ground engaging implement. The tooth assembly of the '717 patent includes an adapter configured for attachment to a base edge of the ground engaging implement and having a forwardly extending adapter nose. The ground engaging tip may have a configuration for providing additional wear material for use in earth moving applications.

Although the tooth assembly disclosed in the '717 patent provides additional wear material, it may not provide desired abrasion-resistance when being pulled backwards through a work material. In addition, it may not provide the desired wear resistance on the bottom surface of the ground engaging tip, for example, when the implement is dragged backwards. The ground engaging tooth assemblies disclosed herein may be directed to mitigating or overcoming one or more of these possible drawbacks.

SUMMARY

In one aspect, the present disclosure is directed to a ground engaging tip. The ground engaging tip may include a rear edge including an upper rear edge and a lower rear edge. The ground engaging tip may also include a front edge opposite the rear edge. The ground engaging tip may further include a top outer surface extending from the upper rear edge toward the front edge, and a bottom outer surface extending from the lower rear edge toward the front edge. The bottom outer surface may include a bottom surface front portion extending from the front edge toward the lower rear edge and terminating at a bottom surface transition portion, and a bottom surface rear portion extending from the transition portion toward the lower rear edge. The bottom surface front portion may include a front portion surface extending in a first direction, and the bottom surface rear portion may include a rear portion surface extending in a second direction. The first direction and the second direction may define an angle, such that the bottom surface rear portion extends toward the top outer surface.

According to another aspect, a ground engaging tip may include a rear edge including an upper rear edge having an upper rear edge width between opposing upper rear edge corners, and a lower rear edge having a lower rear edge width between opposing lower rear edge corners. The ground engaging tip may also include a front edge opposite the rear edge, the front edge having a front edge width between opposing front edge corners. The ground engaging tip may further include a top outer surface extending from the upper rear edge toward the front edge, the top outer surface including a top surface rear portion extending from the upper rear edge toward the front edge and terminating at a top surface transition portion. The top surface rear portion may have top surface lateral edges extending from the upper rear edge corners toward the front edge. The ground engaging tip may also include opposing lateral surfaces extending from the top surface lateral edges toward a bottom outer surface, and opposing lower side flanges extending from the front edge corners to the lower rear edge corners, and extending laterally relative to the lateral surfaces. The front edge width may be larger than the lower rear edge width.

According to still another aspect, a tooth assembly for an edge of a ground engaging implement, may include an adapter configured to be coupled to an edge of a ground engaging implement, the adapter including a nose configured to receive a ground engaging tip at an end of the adapter opposite the edge of the ground engaging implement. The tooth assembly may further include a ground engaging tip coupled to the nose of the adapter. The ground engaging tip may include a rear edge including an upper rear edge and a lower rear edge. The ground engaging tip may also include a front edge opposite the rear edge. The ground engaging tip may further include a top outer surface extending from the upper rear edge toward the front edge, and a bottom outer surface extending from the lower rear edge toward the front edge. The bottom outer surface may include a bottom surface front portion extending from the front edge toward the lower rear edge and terminating at a bottom surface transition portion, and a bottom surface rear portion extending from the bottom surface transition portion toward the lower rear edge. The bottom surface front portion may include a front portion surface extending in a first direction, and the bottom surface rear portion may include a rear portion surface extending in a second direction. The first direction and the second direction may define an angle, such that the bottom surface rear portion extends toward the top outer surface.

BRIEF DESCRIPTION OF THE DRAWINGS

FIG. 11 is a schematic view representing an exemplary system for generating a three-dimensional model of a ground engaging tooth assembly.

DETAILED DESCRIPTION

The exemplary ground engaging tooth assemblies disclosed herein may be used with any ground engaging implements. For example, the exemplary ground engaging tooth assemblies may be used with excavating implements and/or loading implements, such as, for example, buckets for loaders and/or excavators, regardless of size. The exemplary ground engaging tooth assemblies may be configured to assist penetration of the implement into a work material, such as, for example, soil, rock, and/or other materials. According to some embodiments, the ground engaging tooth assemblies may help improve the service life of the implement to which they are coupled.

Figure 1:
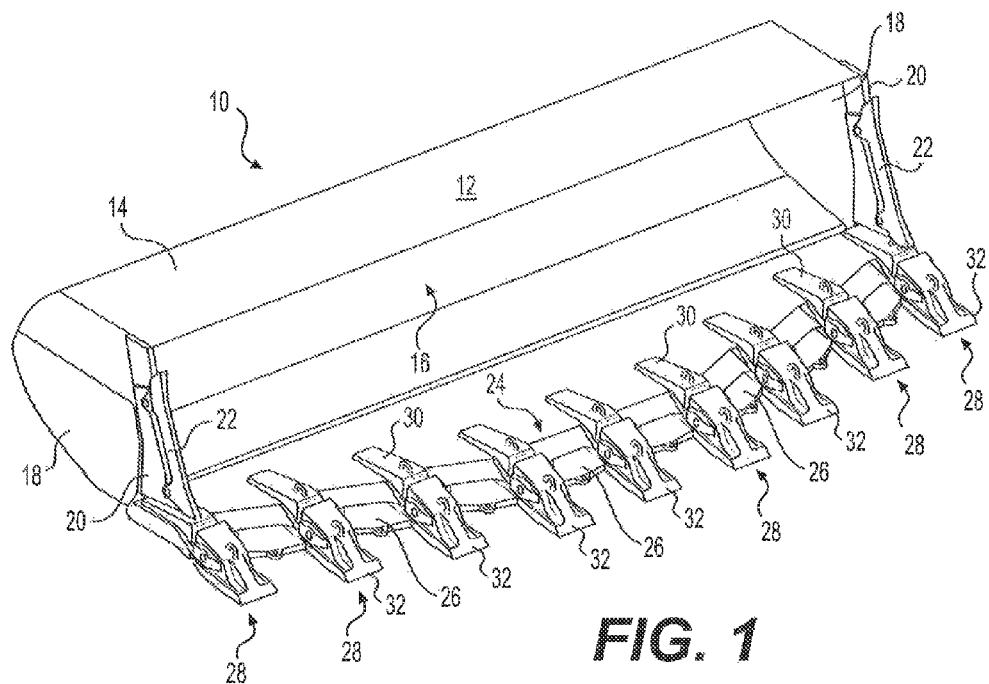
FIG. 1 is a perspective view of an exemplary embodiment of a ground engaging implement and exemplary embodiments of ground engaging tooth assemblies.

FIG. 1 shows an exemplary ground engaging implement assembly 10 including a bucket 12, which may be used to excavate and/or transfer work material from one location to another, for example, from a pile to a truck configured to haul the material to another location. In the exemplary embodiment shown, bucket 12 includes a wrapper 14 forming a receptacle 16 for holding material. Exemplary bucket 12 may also include a pair of opposing side plates 18 coupled to wrapper 14 and respective support arms 20 at leading edges of side plates 18. According to the exemplary embodiment shown, bucket 12 also includes respective corner guards 22 configured to protect the portions of support arms 20 proximal a base edge 24 of bucket 12.

In the exemplary embodiment shown, bucket 12 includes a plurality of edge protector assemblies 26 on base edge 24, and a plurality of ground engaging tooth assemblies 28. Edge protector assemblies 26 and ground engaging tooth assemblies 28 may be positioned on base edge 24 in an alternating manner, for example, as shown in FIG. 1. Edge protector assemblies 26 and ground engaging tooth assemblies 28 may be configured to protect base edge 24 and/or assist with penetration of bucket 12 into a work material.

Figure 2:
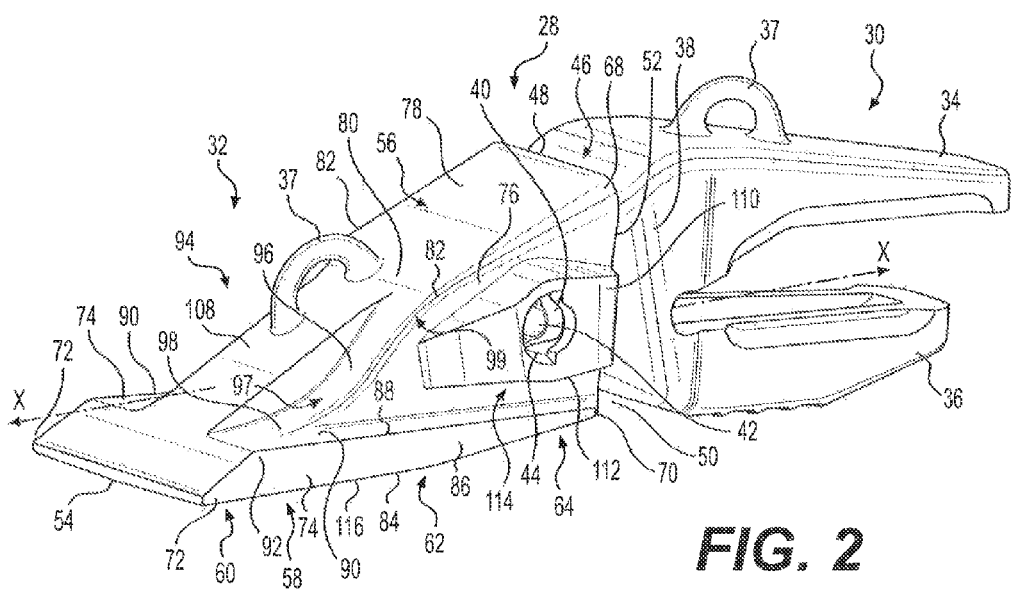
FIG. 2 is a perspective view of an exemplary embodiment of a ground engaging tooth assembly.

FIG. 2 shows a perspective view of an exemplary embodiment of ground engaging tooth assembly 28, in the exemplary embodiment shown, tooth assembly 28 includes an adapter 30 configured to be coupled to base edge 24 of bucket 12, and a ground engaging tip 32 configured to be coupled to adapter 30. For example, adapter 30 includes a top strap 34 and a bottom strap 36 configured to facilitate coupling of adapter 30 to base edge 24. Top strap 34 and/or bottom strap 36 may be coupled to base edge 24 (see FIG. 3) via any known form of coupling, such as, for example, fasteners (e.g., bolts and rivets), adhesives, and/or welding, such that adapter 30 and base edge 24 of bucket 12 do not move relative to one another during use.

Ground engaging tip 32 may be exposed to a majority of impact and abrasion resulting from engagement with the work material, and thus, is susceptible to more wear and damage than adapter 30. According to some embodiments, ground engaging tip 32 may be coupled to adapter 32, worn to a desired level, and replaced without necessarily replacing adapter 30. Eventually, adapter 30 may become worn to a desired level and thereafter be replaced without necessarily replacing bucket 12 or other portions of ground engaging implement assembly 10. According to some embodiments, one or more of adapter 30 and ground engaging tip 32 may include an eye 17, as shown, to facilitate lifting and movement of adapter 30 and/or ground engaging tip 32, for example, via a hoist or other implement.

Exemplary adapter 30 shown in FIGS. 1-5 includes a retention system for securing ground engaging tip 32 to adapter 30 during use. For example, exemplary adapter 30 includes an intermediate portion 38 coupling top strap 34 and bottom strap 36 with a nose 40 of adapter 30. According to the exemplary embodiment shown, nose 40 includes projections 42 on opposite sides of nose 40. According to some embodiments, nose 40 and projections 42 of adapter 30 are configured to be received in a hollow portion of ground engaging tip 32, such that projections 42 on opposite sides of nose 40 are configured to be received in corresponding retention apertures 44 of ground engaging tip 32. According to this exemplary configuration, ground engaging tip 32 may be selectively secured to, and removed from, adapter 30. According to such embodiments, ground engaging tip 32 may be mounted to adapter 30, used until worn to a desired amount, removed, and replaced with a new or refurbished ground engaging tip having the same, a similar, or a different configuration, depending on the desired characteristics of the tip. Other configurations for coupling ground engaging tip 32 to adapter 30 are contemplated.

The exemplary embodiment of ground engaging tip 32 shown in FIGS. 1-5 may be configured to be used when excavating and/or transferring abrasive work materials, such as, for example, work materials including a relatively high sand and/or rock content. For example, the exemplary embodiment shown in FIGS. 1-5 may be configured to exhibit improved resistance to wear in abrasive conditions relative to some other ground engaging tips.

Exemplary ground engaging tip 32 shown in FIGS. 1-5 includes a rear edge 46 including an upper rear edge 48 and a lower rear edge 50 separated by opposing side rear edges 52. Ground engaging tip 32 also includes a front edge 54 at a longitudinally opposite end of ground engaging tip 32 from rear edge 46. Ground engaging tip 32 also includes a top outer surface 56 extending from upper rear edge 48 toward front edge 54. For example, top outer surface 56 may extend to front edge 54. Exemplary ground engaging tip 32 also includes a bottom outer surface 58 extending from lower rear edge 50 toward front edge 54. For example, bottom outer surface 58 may extend to front edge 54. According to some embodiments, top outer surface 56 and bottom outer surface 58 may converge to form front edge 54. According to some embodiments, front edge 54 may be substantially straight in a direction substantially perpendicular to a longitudinal axis X of ground engaging tip 32. According to some embodiments, front edge 54 may include two or more edge segments that meet to form a slight point, for example, such that the two edge segments form a slight angle with respect to one another.

Figure 3:
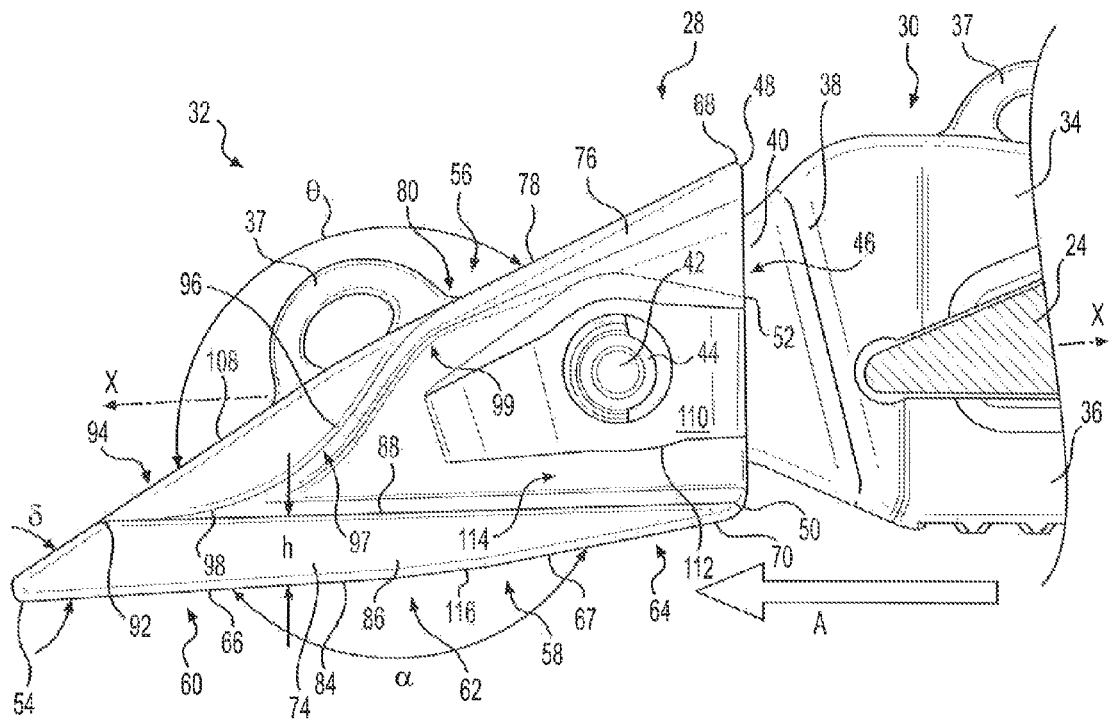
FIG. 3 is a side view of the exemplary embodiment shown in FIG. 2.

According to the exemplary embodiment shown in FIGS. 1-5, bottom outer surface 58 of ground engaging tip 32 includes a bottom surface front portion 60 extending from front edge 54 toward lower rear edge 50 and terminating at a bottom surface transition portion 62, being tangent thereto. According to some embodiments, bottom surface front portion 60 may be substantially planar. As shown in FIG. 3, bottom surface front portion 60 is parallel to longitudinal axis X of ground engaging tip 32. Exemplary bottom outer surface 58 also includes a bottom surface rear portion 64 extending from bottom surface transition portion 62 toward lower rear edge 50, terminating at the lower rear edge. According to the exemplary embodiment shown, bottom surface front portion 60 includes a front portion surface 66 extending in a first direction, and bottom surface rear portion 64 includes a rear portion surface 67 extending in a second direction.

For example, in the exemplary embodiment shown in FIG. 1-5, the first direction and the second direction define an angle α, such that bottom surface rear portion 64 extends toward top outer surface 56. According to some embodiments, bottom surface rear portion 64 may be substantially planar and/or may extend in a substantially uninterrupted manner toward top outer surface 56 and may terminate at lower rear edge 50. For example, bottom surface transition portion 62 may curve through a corner or an arc, such that the first direction and the second direction define an angle α ranging from 181° to 220°. For example, angle α may range from 181° to 200°, or from 181° to 190°. For example, angle α may range from 184° to 190°. The magnitude of angle α may be selected based on parameters, such as, for example, the desired fit between ground engaging tip 32 and adapter 30, the amount of material forming ground engaging tip 32 to provide desired longevity of wear, the effect of the flow of work material as ground engaging tip 32 penetrates the work material and/or as ground engaging tip 32 is withdrawn from the work material, and the effect of the flow of work material as ground engaging tip 32 is dragged backwards (i.e., in a direction opposite the front edge).

For example, as shown in FIG. 3, with bottom surface front portion 60 and longitudinal axis X as references, bottom surface rear portion 64 forms angle α ranging from 184° to 190° with respect to bottom surface front portion 60 and longitudinal axis X. This tapering of bottom outer surface 58 toward top outer surface 56 as ground engaging tip 32 extends toward rear edge 46 may result in reduced resistance to work material flow as ground engaging tip 32 is dragged backwards (e.g., as shown in FIG. 3 with work material flowing in the direction of arrow A). In addition, this exemplary tapered configuration may also result in increased service life for ground engaging tip 32 by reducing wear of bottom surface rear portion 64 resulting from dragging ground engaging tip 32 backwards.

In the exemplary embodiment shown in FIGS. 1-5, upper rear edge 48 has an upper rear edge width $W_{URE}$ between opposing upper rear edge corners 68, and lower rear edge 50 has a lower rear edge width $W_{LRE}$ between opposing lower rear edge corners 70. Exemplary front edge 54 has a front edge width $W_{FE}$ between opposing front edge corners 72. According to the exemplary embodiment shown in FIGS. 1-5 front edge width $W_{FE}$ is larger than lower rear edge width $W_{LRE}$. According to some embodiments, upper rear edge width $W_{URE}$ may be substantially the same, greater than, or less than lower rear edge width $W_{LRE}$, depending on, for example, desired characteristics of ground engaging tip 32.

In the exemplary embodiment shown in FIGS. 1-5, ground engaging tip 32 includes opposing lower side flanges 74 extending from respective front edge corners 72 to respective lower rear edge corners 70. Exemplary lower side flanges 74 extend laterally relative to respective opposing lateral surfaces 76 of ground engaging tip 32. For example, top outer surface 56 includes a top surface rear portion 78 extending from upper rear edge 48 toward front edge 54 and terminating at a top surface transition portion 80. According to some embodiments, top surface rear portion 78 may be substantially planar. Exemplary top surface rear portion 78 includes opposing top surface lateral edges 82 extending from respective upper rear edge corners 68 toward front edge 54. Opposing lateral surfaces 76 extend from respective top surface lateral edges 82 toward bottom outer surface 58. According to some embodiments, lateral surfaces 76 may be substantially planar. Exemplary lower side flanges 74 include respective lower flange edges 84 extending from respective front edge corners 72 toward respective lower rear edge corners 70. Exemplary lower side flanges 74 also include respective lateral flange surfaces 86 extending from respective lower flange edges 84 toward top outer surface 56 and terminating at upper flange edges 88. According to some embodiments, lateral flange surfaces 86 may be substantially planar. Exemplary lower side flanges 74 further include respective return surfaces 90 extending from respective upper flange edges 88 to respective lateral surfaces 76. According to some embodiments, return surfaces 90 may be substantially planar. According to some embodiments, for example, as shown, upper flange edges 88 terminate at an intermediate point 92 short of reaching front edge 54.

For example, as shown in FIG. 3, using bottom surface front portion 60 and longitudinal axis X as references, the height h of lateral flange surfaces 86 tapers as lower side flanges 74 extend toward rear edge 46 of ground engaging tip 32. For example, upper flange edges 88 are substantially parallel (within plus or minus 5°) with respect to bottom surface front portion 60 and longitudinal axis X. This exemplary configuration results in lower side flanges 74 tapering as they extend toward rear edge 46. This may result in reduced resistance to work material flow as ground engaging tip 32 is dragged backwards. In addition, this exemplary tapered configuration may also result in increased service life for ground engaging tip 32 by reducing wear of bottom surface rear portion 64 resulting from dragging ground engaging tip 32 backwards.

Figure 4:
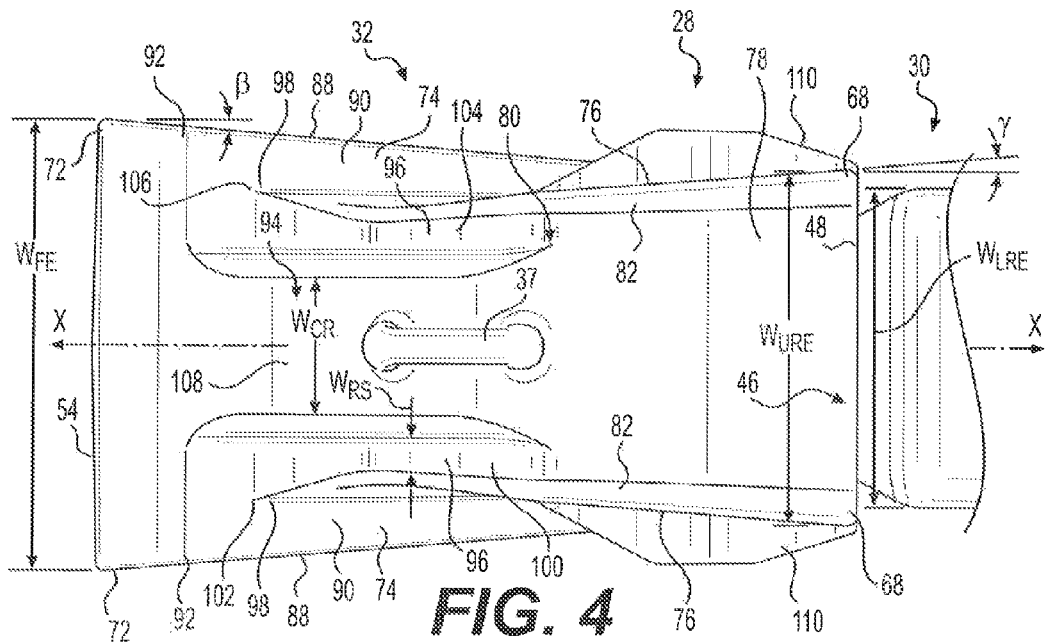
FIG. 4 is a top view of the exemplary embodiment shown in FIG. 2.

As shown in FIG. 4, exemplary lower slide flanges 74 also taper as they extend from front edge corners 72 toward lower rear edge corners 70. For example, lateral flange surfaces 86 form an angle β relative to longitudinal axis X ranging from 1° to 10°, such as, for example, from 3° to 7°. The magnitude of angle β may be selected based on parameters, such as, for example, the desired fit between ground engaging tip 32 and adapter 30, the amount of material forming ground engaging tip 32 to provide desired longevity of wear, the effect of the flow of work material as ground engaging tip 32 penetrates the work material and/or as ground engaging tip 32 is withdrawn from the work material, and the effect of the flow of work material as ground engaging tip 32 is dragged backwards (i.e., in a direction opposite the front edge).

As shown in FIG. 4, exemplary lateral surfaces 76 taper as they extend from upper rear edge corners 68 toward front edge corners 72. For example, lateral surfaces 76 form an angle γ relative to longitudinal axis X ranging from 1° to 10°, such as, for example, from 3° to 7°. This exemplary tapering of lateral surfaces 76 may assist with the penetration of ground engaging tip 32 into the work material.

In the exemplary embodiment shown in FIGS. 1-5, top outer surface 56 includes a top surface front portion 94 extending from top surface transition portion 80 to front edge 54. As shown in FIG. 3, with bottom surface front portion 60 and longitudinal axis X as references, top surface front portion 94 forms an angle δ with respect to bottom surface front portion and longitudinal axis X ranging, for example, from 20° to 40°, from 25° to 35°, or from 28° to 32°. Angle δ may be selected based on parameters, such as, for example, desired ease of penetration into work material and/or desired wear life. As shown in FIG. 3, exemplary top surface front portion 94 forms an angle θ with respect to top surface rear portion 78 ranging, for example, from 181° to 195°, from 181° to 190°, or from 186° to 190°. This results in top outer surface 56 tapering as it extends toward rear edge 46 of ground engaging tip 32. This exemplary configuration may improve ease of penetration of ground engaging tip 32 into the work material.

According to some embodiments, top surface front portion 94 includes opposing recessed relief surfaces 96 extending from top surface transition portion 80 toward front edge 54 and terminating at respective relief ends 98. For example, recessed relief surfaces 96 include a first recessed relief surface 100 terminating at a first relief end 102, and a second recessed relief surface 104 extending from top surface transition portion 80 toward front edge 54 and terminating at a second relief end 106.

Exemplary recessed relief surfaces 96 shown in FIGS. 1-5 include a curved concave portion 97 and a curved convex portion 99. For example, as shown in FIG. 3, concave portion 97 is generally configured as an arc of a circle with one end terminating substantially tangent with respect to return surfaces 90 of lower side flanges 74 and the other end transitioning into convex portion 99. According to some embodiments, the circle may have a radius ranging, for example, from 20% to 50% of the distance from front edge 54 to upper rear edge 48 of ground engaging tip 32. For example, the radius may range from 25% to 40%, from 25% to 35%, or from 30% to 35%, of the distance from front edge 54 to upper rear edge 48 of ground engaging tip 32.

According to some embodiments, recessed relief surfaces 96 may be configured to substantially maintain the sharpness of ground engaging tip 32 as it wears. According to some embodiments, recessed relief surfaces 96 may be configured to guide work material over ground engaging tooth assembly 28 and into bucket 12.

Figure 5:
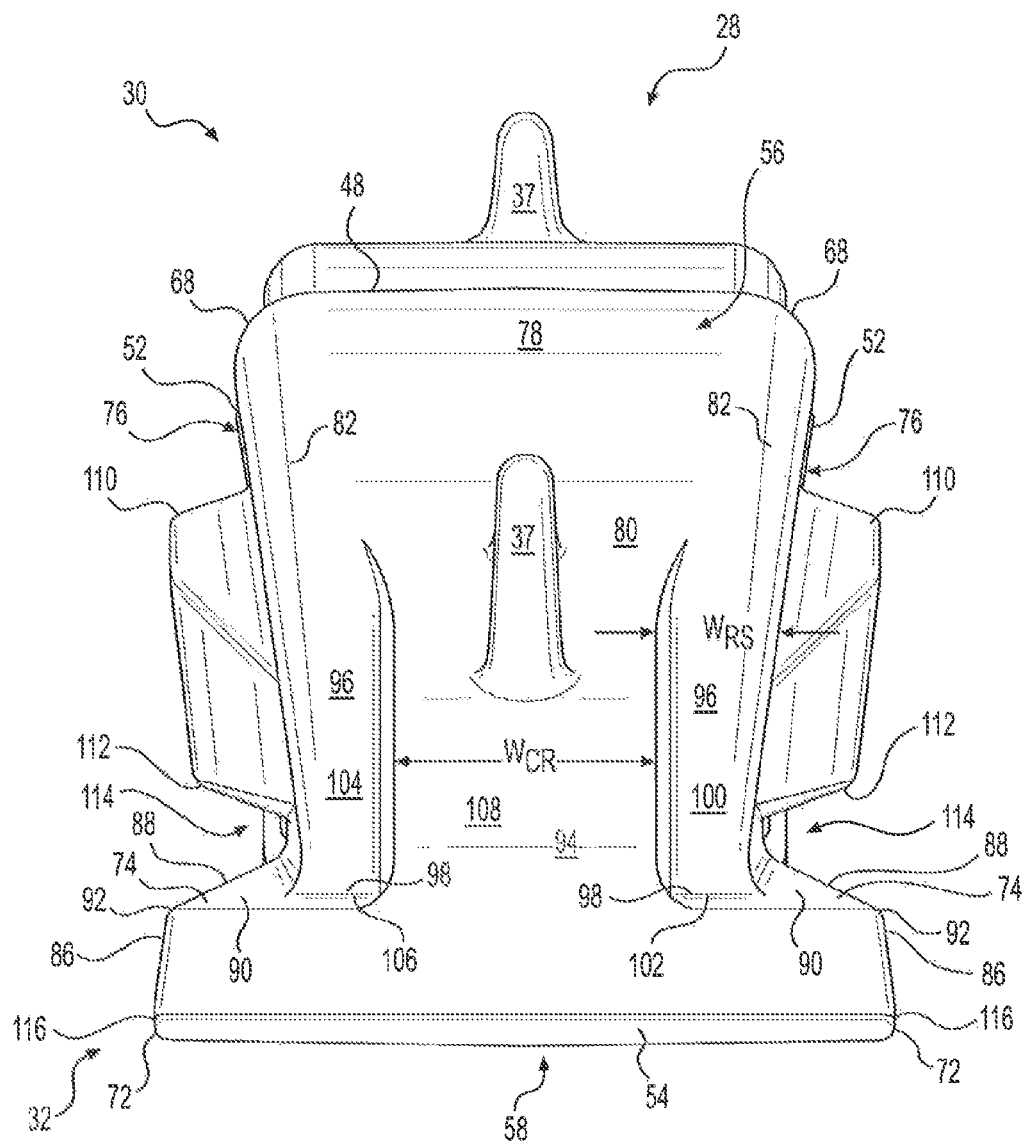
FIG. 5 is a front view of the exemplary embodiment shown in FIG. 2.
Figure 6:
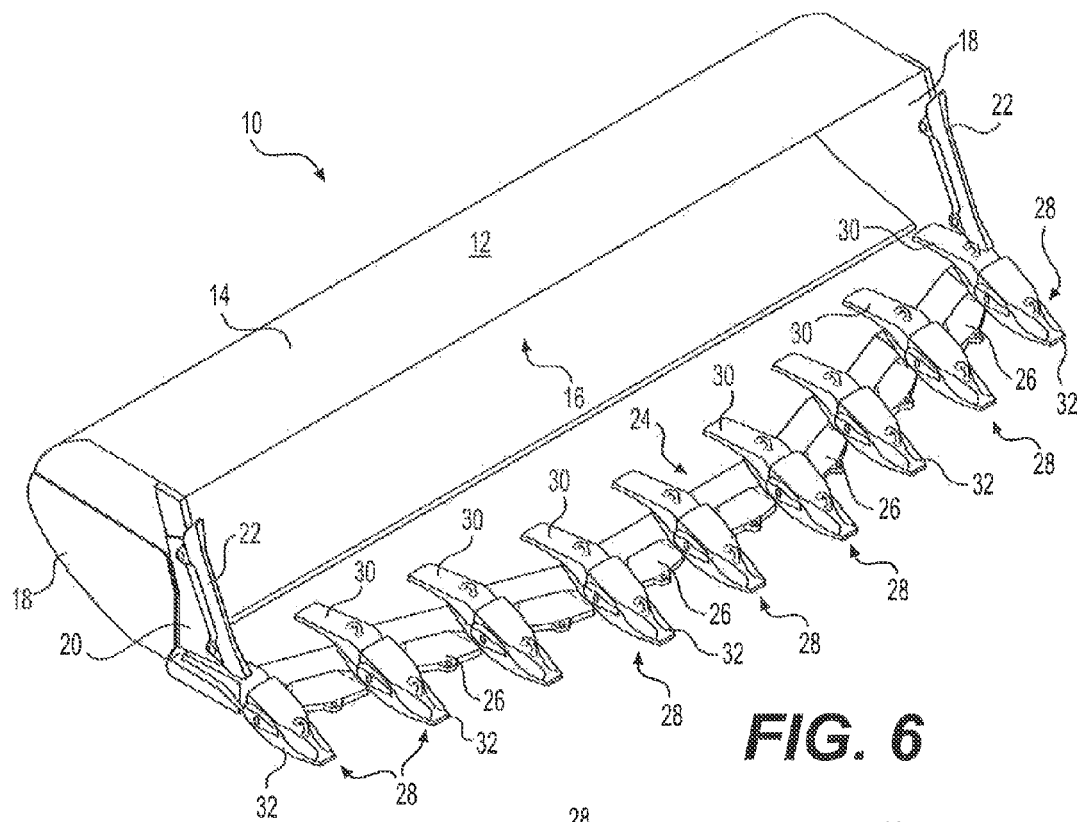
FIG. 6 is a perspective view of an exemplary embodiment of a ground engaging implement and exemplary embodiments of ground engaging tooth assemblies.
Figure 7:
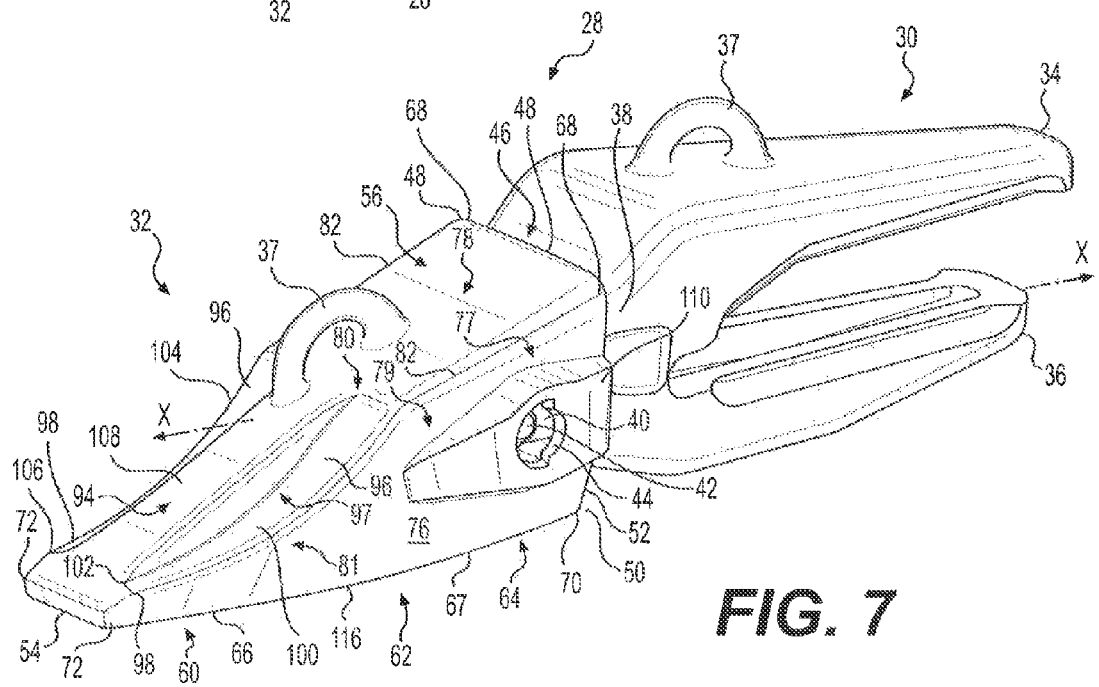
FIG. 7 is a perspective view of an exemplary embodiment of a ground engaging tooth assembly.

In the exemplary embodiment shown in FIGS. 1-5, first and second recessed relief surfaces 100 and 104 are separated from one another by a center rib 108 extending from top surface transition portion 80 toward front edge 54. According to some embodiments, for example, as shown in FIG. 5, center rib 108 may have a width $W_{CR}$, and recessed relief surfaces 96 may have a combined average width (i.e., the sum of the average widths $W_{RS}$ of each of first and second recessed relief surfaces 100 and 104), such that the combined average widths $W_{RS}$ range from 50% to 90% of width $W_{CR}$ of center rib 108. For example, the combined average width of may range from 60% to 80% of width $W_{CR}$, from 65% to 75%, or from 70% to 75% of width $W_{CR}$.

According to some embodiments, center rib 108 may be configured to increase the strength of ground engaging tip 32, while recessed relief surfaces 96 may provide a configuration for improving material flow around ground engaging tip 32. The relative widths of center rib 108 and recessed relief surfaces 96 may be selected based on parameters, such as, for example, the strength of ground engaging tip 32 and desired material flow past ground engaging tip 32.

According to some embodiments, first and second recessed relief surfaces 100 and 104 terminate short of reaching front edge 54. According to some embodiments, first and second recessed relief surfaces 102 and 104, and lower side flanges 74 terminate short of front edge 54, for example, such that a chisel is formed by center rib 108 and front edge 54, with the chisel being wider at front edge 54 than center rib 108. According to some embodiments, the chisel and center rib 108 may share a common plane, for example, as shown in FIGS. 2-5. The exemplary chisel configuration may improve penetration of ground engaging tip 32 into the work material, while also providing more material to increase service life as ground engaging tip 32 wears from use.

The exemplary embodiment shown in FIGS. 1-5 also includes opposing retention lobes 110 surrounding respective retention apertures 44. Exemplary retention lobes 110 protrude from respective lateral surfaces 76 and serve to protect retention apertures 44 and/or projections 42 of adapter 30 from damage resulting from the work material flowing past ground engaging tip 32 as ground engaging tip 32 penetrates and is removed from the work material. This may enable ground engaging tip 32 to be selectively secured to and removed from adapter 30, even after ground engaging tip 32 is worn to a condition suggesting replacement. In the exemplary embodiment shown, retention lobes 110 include lower lobe edges 112, and lower side flanges 74 and lower lobe edges 112 of respective retention lobes 110 define respective channels 114 through which the work material may pass. For example, lower lobe edges 112 and return surfaces 90 of lower side flanges 74 may be configured to be generally parallel, thereby promoting the passage of work material through channels 114.

According to some embodiments, ground engaging tip 32 may be configured to have an enhanced ability to penetrate the work material, for example, when the work material presents a relatively harder surface. For example, the exemplary embodiment shown in FIGS. 6-10 may be configured to exhibit improved penetration relative to some other ground engaging tips.

In the exemplary embodiment shown in FIGS. 6-10, grounding engaging tooth assembly 28 may be configured to be coupled together in a manner similar to the exemplary embodiment previously described with respect to FIGS. 1-5. For example, tooth assembly 28 includes an adapter 30 configured to be coupled to base edge 24 of bucket 12, and ground engaging tip 32 is configured to be coupled to adapter 30. For example, adapter 30 includes a top strap 34 and a bottom strap 36 configured to facilitate coupling of adapter 30 to base edge 24. Top strap 34 and/or bottom strap 36 may be coupled to base edge 24 (see FIG. 8) via any known connection, such as, for example, fasteners (e.g., bolts and rivets), adhesives, and/or welding, such that adapter 30 and base edge 24 of bucket 12 do not move relative to one another during use.

Exemplary adapter 30 shown in FIGS. 6-10 also includes a retention system for securing ground engaging tip 32 to adapter 30 during use. For example, exemplary adapter 30 includes an intermediate portion 38 coupling top strap 34 and bottom strap 36 with a nose 40 of adapter 30. According to the exemplary embodiment shown, nose 40 includes projections 42 on opposite sides of nose 40. According to some embodiments, nose 40 and projections 42 of adapter 30 are configured to be received in a hollow portion of a ground engaging tip 32, such that projections 42 on opposite sides of nose 40 are configured to be received in corresponding retention apertures 44 of ground engaging tip 32. According to this exemplary configuration, ground engaging tip 32 may be selectively secured to and removed from adapter 30. According to such embodiments, ground engaging tip 32 may be mounted to adapter 30, used until worn to a desired amount, removed, and replaced with a new or refurbished ground engaging tip having the same, a similar, or a different configuration, depending on the desired characteristics of the tip. Other configurations for coupling ground engaging tip 32 to adapter 30 are contemplated.

Exemplary ground engaging tip 32 shown in FIGS. 6-10 includes a rear edge 46 including an upper rear edge 48 and a lower rear edge 50 separated by opposing side rear edges 52. Ground engaging tip 32 also includes a front edge 54 at a longitudinally opposite end of ground engaging tip 32 from rear edge 46. Ground engaging tip 32 also includes a top outer surface 56 extending from upper rear edge 48 toward front edge 54. For example, top outer surface 56 may extend to front edge 54. Exemplary ground engaging tip 32 also includes a bottom outer surface 58 extending from lower rear edge 50 toward front edge 54. For example, bottom outer surface 58 may extend to front edge 54. According to some embodiments, top outer surface 56 and bottom outer surface 58 may converge to form front edge 54. According to some embodiments, front edge 54 may be substantially straight in a direction substantially perpendicular to longitudinal axis X of ground engaging tip 32.

According to the exemplary embodiment shown in FIGS. 6-10, bottom outer surface 58 of ground engaging tip 32 includes a bottom surface front portion 60 extending from front edge 54 toward lower rear edge 50 and terminating at a bottom surface transition portion 62. According to some embodiments, bottom surface front portion 60 may be substantially planar. Exemplary bottom outer surface 58 also includes a bottom surface rear portion 64 extending from bottom surface transition portion 62 toward lower rear edge 50. According to the exemplary embodiment shown, bottom surface front portion 60 includes a front portion surface 66 extending in a first direction, and bottom surface rear portion 64 includes a rear portion surface 67 extending in a second direction.

For example, in the exemplary embodiment shown in FIG. 6-10, the first direction and the second direction define an angle α, such that bottom surface rear portion 64 extends toward top outer surface 56. According to some embodiments, bottom surface rear portion 64 may be substantially planar and/or may extend in a substantially uninterrupted manner toward top outer surface 56 and may terminate at lower rear edge 50. For example, bottom surface transition portion 62 may curve through a corner or an arc, such that the first direction and the second direction define an angle α ranging from 181° to 220°. For example, angle α may range from 181° to 200°, or from 181° to 190°. For example, angle α may range from 184° to 190°. The magnitude of angle α may be selected based on parameters, such as, for example, the desired fit between ground engaging tip 32 and adapter 30, the amount of material forming ground engaging tip 32 to provide desired longevity of wear, the effect of the flow of work material as ground engaging tip 32 penetrates the work material and/or as ground engaging tip 32 is withdrawn from the work material, and the effect of the flow of work material as ground engaging tip 32 is dragged backwards.

Figure 8:
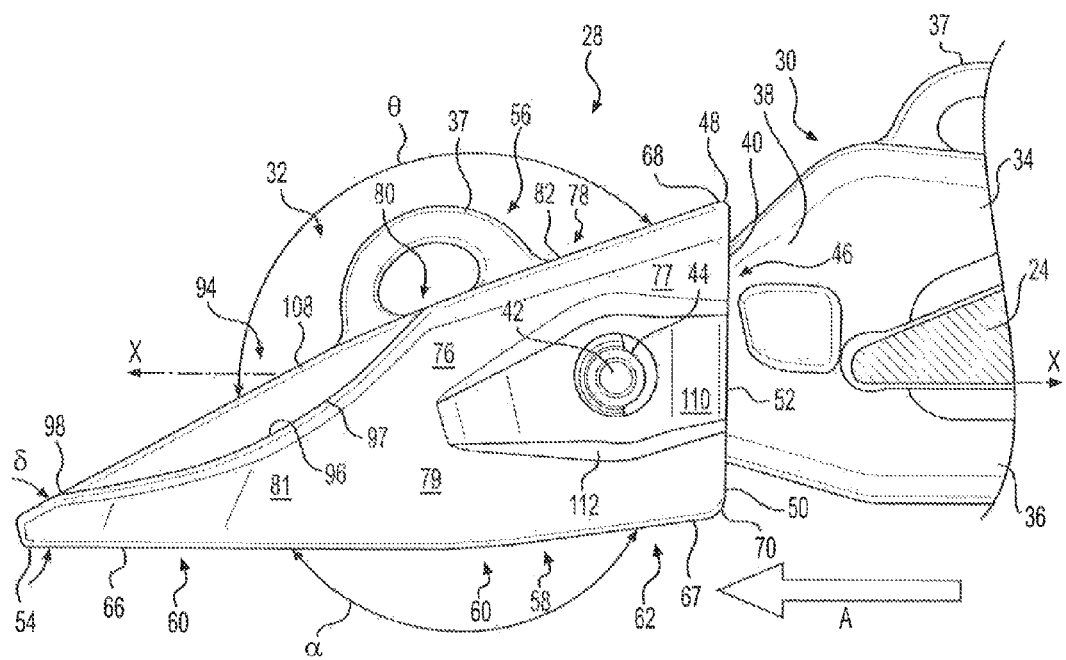
FIG. 8 is a side view of the exemplary embodiment shown in FIG. 7.

For example, as shown in FIG. 8, with bottom surface front portion 60 and longitudinal axis X as references, bottom surface rear portion 64 forms angle α ranging from 184° to 190° with respect to bottom surface front portion 60 and longitudinal axis X. This tapering of bottom outer surface 58 toward top outer surface 56 as ground engaging tip 32 extends toward rear edge 46 may result in reduced resistance to work material flow as ground engaging tip 32 is dragged backwards (e.g., as shown in FIG. 8 with work material flowing in the direction of arrow A). In addition, this exemplary tapered configuration may also result in increased service life for ground engaging tip 32 by reducing wear of bottom surface rear portion 64 resulting from dragging ground engaging tip 32 backwards.

In the exemplary embodiment shown in FIGS. 6-10, upper rear edge 48 has an upper rear edge width $W_{URE}$ between opposing upper rear edge corners 68, and lower rear edge 50 has a lower rear edge width $W_{LRE}$ between opposing lower rear edge corners 70. Exemplary front edge 54 has a front edge width $W_{FE}$ between opposing front edge corners 72. According to some embodiments, for example, as shown in FIGS. 6-10, at least one of upper rear edge width $W_{URE}$ and lower rear edge width $W_{LRE}$ is larger than front edge width $W_{FE}$.

In the exemplary embodiment shown in FIGS. 6-10, ground engaging tip 32 includes top surface lateral edges 82 extending from respective upper rear edge corners 68 toward front edge corners 72, and opposing lateral surfaces 76 extending from respective top surface lateral edges 82 toward bottom outer surface 58. Bottom outer surface 58 includes bottom surface lateral edges 116 extending from respective opposing lower rear edge corners 70 toward respective front edge corners 72.

Figure 9:
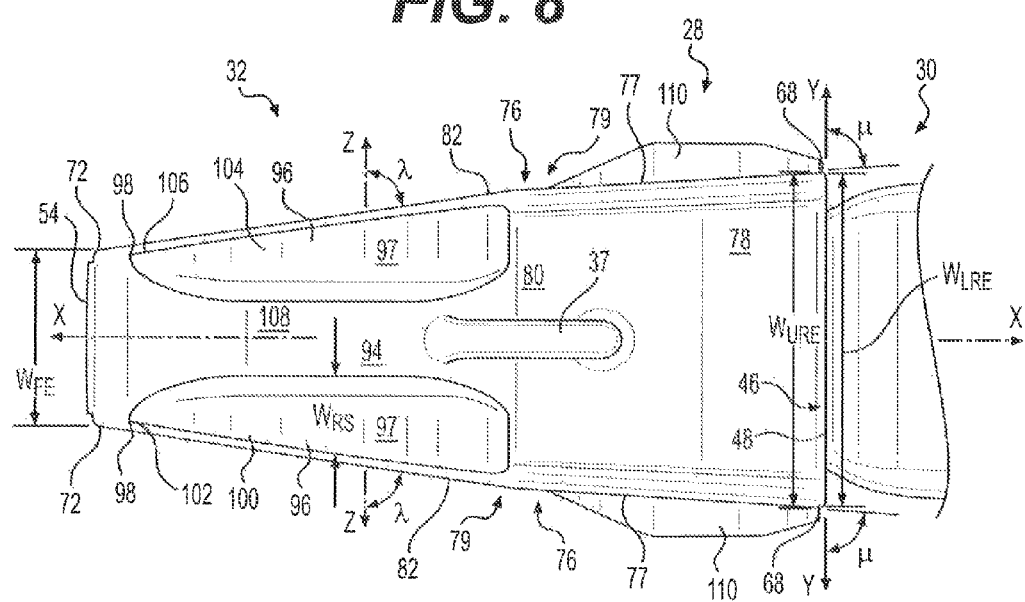
FIG. 9 is a top view of the exemplary embodiment shown in FIG. 7.

As shown in FIG. 9, exemplary lateral surfaces 76 taper as they extend from rear edge 46 toward front edge corners 72. For example, lateral surfaces 76 include respective lateral surface rear portions 77 extending to respective lateral surface transition portions 79. For example, lateral surface rear portions 77 form an angle μ relative to an axis Y perpendicular to longitudinal axis X ranging from 80° to 89°, such as, for example, from 84° to 88°. According to some embodiments, lateral surface rear portions 77 may be substantially planar. In addition, exemplary lateral surfaces 76 include respective lateral surface front portions 81 extending from respective lateral surface transition portions 79 to respective front edge corners 72. For example, lateral surface front portions 81 form an angle λ relative to an axis Z perpendicular to longitudinal axis X ranging from 75° to 85°, such as, for example, from 77° to 83°. This exemplary tapering of lateral surfaces 76 may assist with the penetration of ground engaging tip 32 into the work material. According to some embodiments, lateral surface front portions 81 may be substantially planar.

Top outer surface 56 includes top surface rear portion 78 extending from upper rear edge 48 toward front edge 54 and terminating at top surface transition portion 80. According to some embodiments, top surface rear portion 78 may be substantially planar. Exemplary top outer surface 56 further includes top surface front portion 94 extending from top surface transition portion 80 to front edge 54. As shown in FIG. 8, with bottom surface front portion 60 and longitudinal axis X as references, top surface front portion 94 forms an angle δ with respect to bottom surface front portion 60 and longitudinal axis X ranging, for example, from 20° to 40°, from 25° to 35°, or from 26° to 32°. Angle δ may be selected based on parameters, such as, for example, desired ease of penetration into work material and/or desired wear life. As shown in FIG. 8, exemplary top surface front portion 94 forms an angle θ with respect to top surface rear portion 78 ranging, for example, from 181° to 195°, from 181° to 190°, or from 186° to 190°. This results in top outer surface 56 tapering as top outer surface 56 extends toward rear edge 46 of ground engaging tip 32. This exemplary configuration may improve ease of penetration of ground engaging tip 32 into the work material.

According to some embodiments, top surface front portion 94 includes opposing recessed relief surfaces 96 extending from top surface transition portion 80 toward front edge 54 and terminating at respective relief ends 98. For example, recessed relief surfaces 96 include a first recessed relief surface 100 terminating at a first relief end 102, and a second recessed relief surface 104 extending from top surface transition portion 80 toward front edge 54 and terminating at a second relief end 106.

Exemplary recessed relief surfaces 96 shown in FIGS. 6-10 include a curved concave portion 97. For example, as shown in FIG. 8, concave portion 97 is generally configured as an arc of a circle with one end terminating substantially parallel with respect to bottom surface front portion 60 and the other end terminating substantially at top surface transition portion 80. According to some embodiments, the circle may have a radius ranging, for example, from 50% to 80% of the distance from front edge 54 to upper rear edge 48 of ground engaging tip 32. For example, the radius may range from 55% to 75%, or from 60% to 70%, of the distance from front edge 54 to upper rear edge 48 of ground engaging tip 32.

According to some embodiments, recessed relief surfaces 96 may be configured to substantially maintain the sharpness of ground engaging tip 32 as it wears. According to some embodiments, recessed relief surfaces 96 may be configured to guide work material over ground engaging tooth assembly 28 and into bucket 12.

Figure 10:
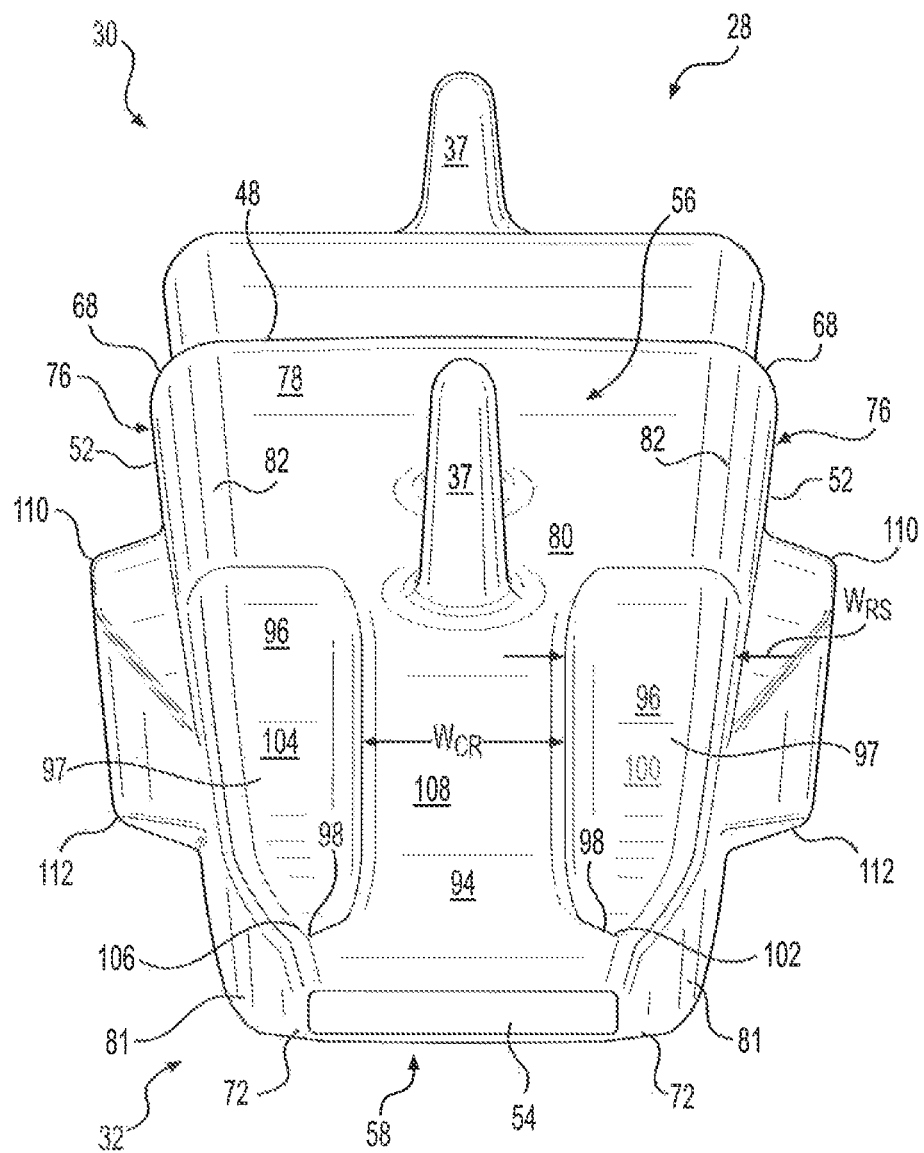
FIG. 10 is a front view of the exemplary embodiment shown in FIG. 7.

In the exemplary embodiment shown in FIGS. 6-10, first and second recessed relief surfaces 100 and 104 are separated from one another by a center rib 108 extending from top surface transition portion 80 toward front edge 54. According to some embodiments, for example, as shown in FIG. 10, center rib 108 may have a width $W_{CR}$, and recessed relief surfaces 96 may have a combined average width (i.e., the sum of the average widths $W_{RS}$ of each of first and second recessed relief surfaces 100 and 104), such that width $W_{CR}$ of center rib 108 ranges from 50% to 80% of the combined average widths of recessed relief surfaces 96. For example, width $W_{CR}$ of center rib 108 may range from 55% to 75%, or from 60% to 70%, of the combined average width of recessed relief surfaces 96.

According to some embodiments, center rib 108 may be configured to increase the strength of ground engaging tip 32, while recessed relief surfaces 96 provide a configuration for improving material flow around ground engaging tip 32. The relative widths of center rib 108 and recessed relief surfaces 96 may be selected based on one or more parameters, such as, for example, improved strength and material flow.

According to some embodiments, first and second recessed relief surfaces 100 and 104 terminate short of reaching front edge 54. According to some embodiments, first and second recessed relief surfaces 102 and 104 terminate short of front edge 54, for example, such that a chisel is formed by center rib 108 and front edge 54, and the chisel is wider at front edge 54 than center rib 108. According to some embodiments, the chisel and center rib 108 may share a common plane, for example, as shown in FIGS. 7-10. The exemplary chisel configuration may improve penetration of ground engaging tip 32 into the work material. While also providing more material to increase service life as ground engaging tip 32 wears from use.

The exemplary embodiment shown in FIGS. 6-10 also includes opposing retention lobes 110 surrounding respective retention apertures 44. Exemplary retention lobes 110 protrude from respective lateral surfaces 76 and serve to protect retention apertures 44 and/or projections 42 of adapter 30 from damage from the work material flowing past ground engaging tip 32 as ground engaging tip 32 penetrates and is removed from the work material. This may enable ground engaging tip 32 to be selectively secured to and removed from adapter 30, even after ground engaging tip 32 is worn to a condition suggesting replacement.

INDUSTRIAL APPLICABILITY

The exemplary ground engaging tooth assemblies disclosed herein may be used with any machines that include ground engaging implements, including implements configured to penetrate soil, sand, gravel, rock, and other materials. For example, the exemplary ground engaging tooth assemblies may be used with excavating implements and/or loading implements, such as, for example, buckets for loaders and/or excavators. According to some embodiments, the ground engaging tooth assemblies may help improve the service life of the implement to which they are coupled. In addition, the ground engaging tooth assemblies may be relatively more abrasion-resistant when being pulled backwards through a work material than some other ground engaging tooth assemblies. The ground engaging tooth assemblies may also be relatively more wear resistant when dragged backwards against a surface such as the ground. According to some embodiments, the ground engaging tips may have a greater ability to substantially maintain their sharpness as they wear from use, for example, due to their shape.

For example, embodiments where the bottom outer surface of the ground engaging tip is tapered as the ground engaging tip extends toward its rear edge may exhibit reduced resistance to work material flow as the ground engaging tip is dragged backwards. In addition, such a tapered configuration may also result in increased service life for the ground engaging tip by reducing wear of the bottom surface rear portion resulting from dragging the ground engaging tip backwards. For embodiments that include tapered lower side flanges, the tapering of the lower side flanges as they extend toward the real edge may also result in a reduced resistance to the flow of work material as the ground engaging tip is moved backwards. Tapering of the lower side flanges may also result in increased service life for the ground engaging tip by reducing wear of the bottom surface rear portion resulting from dragging the ground engaging tip backwards. The lower side flanges may also increase the service life of the ground engaging tip as a result of providing more material for wear.

According to embodiments having a center rib, the center rib may enhance the strength of the ground engaging tip, thereby increasing its service life. For embodiments including recessed relief surfaces, the ground engaging tip may substantially maintain its sharpness as it wears with use. In addition, the recessed relief surfaces may assist with the flow of work material over and around the ground engaging tooth assembly and into the bucket. For embodiments having a chisel-shaped front edge, the shape may increase the ability of the ground engaging tip to penetrate the work material, with the center rib providing additional strength.

The disclosed ground engaging tooth assemblies, including the disclosed adapters and/or ground engaging tips, may be manufactured using conventional techniques, such as, for example, casting or molding. Alternatively, the disclosed ground engaging tooth assemblies may be manufactured using conventional techniques generally referred to as additive manufacturing or additive fabrication. Known additive manufacturing/fabrication processes include techniques, such as, for example, 3D printing. 3D printing is a process in which material may be deposited in successive layers under the control of a computer. The computer controls additive fabrication equipment to deposit the successive layers according to a three-dimensional model (e.g., a digital file, such as an AMF or STL file) that is configured to be converted into a plurality of slices, for example, substantially two-dimensional slices, that each define a cross-sectional layer of the ground engaging tooth assemblies in order to manufacture, or fabricate, the around engaging tooth assemblies. In one instance, the disclosed ground engaging tooth assemblies would be an original component, and the 3D printing process would be utilized to manufacture the ground engaging tooth assemblies. In other instances, the 3D process could be used to replicate existing ground engaging tooth assemblies, and the replicated ground engaging tooth assemblies could be sold as aftermarket parts. These replicated aftermarket ground engaging tooth assemblies could be either exact copies of the original ground engaging tooth assemblies or pseudo copies differing in only non-critical aspects.

With reference to FIG. 11, the three-dimensional model 130 used to represent an original ground engaging tooth assembly 28 may be on a computer-readable storage medium 132, such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium may be used in connection with commercially available 3D printers 134 to manufacture, or fabricate, the ground engaging tooth assembly. Alternatively, the three-dimensional model may be transmitted electronically to the 3D printer 134 in a streaming fashion without being permanently stored at the location of the 3D printer 134. In either instance, the three-dimensional model constitutes a digital representation of the ground engaging tooth assemblies suitable for use in manufacturing the ground engaging tooth assemblies.

The three-dimensional model may be formed in a number of known ways. In general, the three-dimensional model is created by inputting data 136 representing the ground engaging tooth assemblies to a computer or a processor 138, such as a cloud-based software operating system. The data may then be used as a three-dimensional model representing the physical ground engaging tooth assemblies. The three-dimensional model is intended to be suitable for the purposes of manufacturing the ground engaging tooth assemblies. In an exemplary embodiment, the three-dimensional model is suitable for the purpose of manufacturing the ground engaging tooth assemblies by an additive manufacturing technique.

In the exemplary embodiment shown in FIG. 11, the inputting of data may be achieved with a 3D scanner 140. The method may involve contacting the ground engaging tooth assemblies 28 via a contacting and data receiving device, and receiving data from the contacting in order to generate the three-dimensional model. For example, 3D scanner 140 may be a contact-type scanner. The scanned data may be imported into a 3D modeling software program to prepare a digital data set, in some embodiments, the contacting may occur via direct physical contact using a coordinate measuring machine that measures the physical structure of the ground engaging tooth assemblies 28 by contacting a probe with the surfaces of the ground engaging tooth assemblies 28 in order to generate a three-dimensional model. In other embodiments, the 3D scanner 140 may be a non-contact type scanner, and the method may include directing projected energy (e.g., light or ultrasonic energy) onto the ground engaging tooth assembly to be replicated and receiving the reflected energy. From this reflected energy, a computer may be used to generate a computer-readable three-dimensional model for use in manufacturing the ground engaging tooth assembly. In various embodiments, multiple two-dimensional images may be used to create a three-dimensional model. For example, 2D slices of a 3D object may be combined to create the three-dimensional model. In lieu of a 3D scanner, the inputting of data may be performed using computer-aided design (CAD) software. In such instances, the three-dimensional model may be formed by generating a virtual 3D model of the disclosed ground engaging tooth assembly using the CAD software. A three-dimensional model may be generated from the CAD virtual 3D model in order to manufacture the ground engaging tooth assembly.

The additive manufacturing process utilized to create the disclosed ground engaging tooth assemblies may involve materials, such as, for example, plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

It will be apparent to those skilled in the art that various modifications and variations can be made to the exemplary disclosed ground engaging tooth assemblies, adapters, and ground engaging tips. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A ground engaging tip comprising:
    a rear edge including an upper rear edge and a lower rear edge;
    a front edge opposite the rear edge;
    a top outer surface extending from the upper rear edge toward the front edge; and
    a bottom outer surface extending from the lower rear edge toward the front edge,
    wherein the bottom outer surface includes:
        a bottom surface front portion extending from the front edge toward the lower rear edge and terminating at a bottom surface transition portion being tangent thereto; and
        a bottom surface rear portion extending from the bottom surface transition portion toward the lower rear edge and terminating at the lower rear edge,
        wherein the bottom surface front portion includes a planar front portion surface extending in a first direction, and the bottom surface rear portion includes a planar rear portion surface extending in a second direction, and
        wherein the first direction and the second direction define an angle, wherein the angle ranges from 181 to 220 degrees.

2. The ground engaging tip of claim 1, wherein the upper rear edge has an upper rear edge width between opposing upper rear edge corners, and the lower rear edge having a lower rear edge width between opposing lower rear edge corners, and wherein the front edge has a front edge width between opposing front edge corners, wherein the front edge width is larger than the lower rear edge width.

3. The ground engaging tip of claim 2, further including opposing lower side flanges extending from the front edge corners to the lower rear edge corners, and extending laterally relative to opposing lateral surfaces of the ground engaging tip.

4. The ground engaging tip of claim 3, wherein the top outer surface includes a top surface rear portion extending from the upper rear edge toward the front edge and terminating at a top surface transition portion, wherein the top surface rear portion has top surface lateral edges extending from the upper rear edge corners toward the front edge, and wherein the opposing lateral surfaces extend from the top surface lateral edges toward a bottom outer surface.

5. The ground engaging tip of claim 3, wherein the lower side flanges include:
    lower flange edges extending from the front edge corners toward the lower rear edge corners; and
    lateral flange surfaces extending from the lower flange edges toward the top outer surface and terminating at upper flange edges.

6. The ground engaging tip of claim 5, wherein the lower side flanges further include return surfaces extending from the upper flange edges to the opposing lateral surfaces, and wherein the upper flange edges terminate at an intermediate point short of reaching the front edge.

7. The ground engaging tip of claim 1, wherein the upper rear edge has an upper rear edge width between opposing upper rear edge corners, and the lower rear edge has a lower rear edge width between opposing lower rear edge corners, wherein front edge has a front edge width between opposing front edge corners, and wherein at least one of the upper rear edge width and the lower rear edge width is larger than the front edge width.

8. The ground engaging tip of claim 7, further including top surface lateral edges extending from the upper rear edge corners toward the front edge corners, and opposing lateral surfaces extending from the top surface lateral edges toward the bottom outer surface.

9. The ground engaging tip of claim 8, wherein the bottom outer surface includes bottom surface lateral edges extending from opposing lower rear edge corners toward the front edge corners.

10. The ground engaging tip of claim 7, wherein the top outer surface includes a top surface rear portion extending from the upper rear edge toward the front edge and terminating at a top surface transition portion, wherein the top outer surface further includes a top surface front portion extending from the top surface transition portion to the front edge, wherein the top surface front portion includes a recessed relief surface extending from the top surface transition portion toward the front edge and terminating at a relief end.

11. The ground engaging tip of claim 10, wherein the recessed relief surface is a first recessed relief surface terminating at a first relief end, and wherein the top surface front portion further includes a second recessed relief surface extending from the top surface transition portion toward the front edge and terminating at a second relief end.

12. The ground engaging tip of claim 11, wherein the first and second recessed relief surfaces are separated by a center rib extending from the top surface transition portion toward the front edge.

13. A method of creating a computer-readable three-dimensional model suitable for use in manufacturing the ground engaging tip of claim 1, the method comprising:
    inputting data representing the ground engaging tip to a computer; and
    using the data to represent the ground engaging tip as a three-dimensional model, the three dimensional model being suitable for use in manufacturing the ground engaging tip.

14. The method of claim 13, wherein the inputting of data includes at least one of using a contact-type 3D scanner to contact the ground engaging tip, using a non-contact 3D scanner to project energy onto the ground engaging tip and receive reflected energy, and generating a virtual three-dimensional model of the ground engaging tip using computer-aided design (CAD) software.

15. A computer-readable three-dimensional model suitable for use in manufacturing the ground engaging tip of claim 1.

16. A computer-readable storage medium having data stored thereon representing a three-dimensional model suitable for use in manufacturing the ground engaging tip of claim 1.

17. A method for manufacturing the ground engaging tip of claim 1, the method comprising the steps of:
    providing a computer-readable three-dimensional model of the ground engaging tip, the three-dimensional model being configured to be converted into a plurality of slices that each define a cross-sectional layer of the ground engaging tip; and
    successively forming each layer of the ground engaging tip by additive manufacturing.

18. A ground engaging tip comprising:
    a rear edge including an upper rear edge having an upper rear edge width between opposing upper rear edge corners, and a lower rear edge having a lower rear edge width between opposing lower rear edge corners;

a front edge opposite the rear edge, the front edge having a front edge width between opposing front edge corners;

a top outer surface extending from the upper rear edge toward the front edge, the top outer surface including a top surface rear portion extending from the upper rear edge toward the front edge and terminating at a top surface transition portion, wherein the top surface rear portion has top surface lateral edges extending from the upper rear edge corners toward the front edge;

opposing lateral surfaces extending from the top surface lateral edges toward a bottom outer surface; and opposing lower side flanges extending from the front edge corners to the lower rear edge corners, and extending laterally relative to the opposing lateral surfaces, wherein the front edge width is larger than the lower rear edge width.

19. The ground engaging tip of claim 18, wherein the lower side flanges include:

lower flange edges extending from the front edge corners toward the lower rear edge corners; and lateral flange surfaces extending from the lower flange edges toward the top outer surface and terminating at upper flange edges.

20. The ground engaging tip of claim 19, wherein the lower side flanges further include return surfaces extending from the upper flange edges to the opposing lateral surfaces.

21. The ground engaging tip of claim 20, wherein the upper flange edges terminate at an intermediate point short of reaching the front edge.

22. The ground engaging tip of claim 18, wherein the top outer surface includes a top surface front portion extending from the top surface transition portion to the front edge, wherein the top surface front portion includes a recessed relief surface extending from the top surface transition portion toward the front edge and terminating at a relief end.

23. The ground engaging tip of claim 22, wherein the recessed relief surface is a first recessed relief surface terminating at a first relief end, and wherein the top surface front portion further includes a second recessed relief surface extending from the top surface transition portion toward the front edge and terminating at a second relief end.

24. The ground engaging tip of claim 23, wherein the first and second recessed relief surfaces are separated by a center rib extending from the top surface transition portion toward the front edge.

25. The ground engaging tip of claim 24, wherein the first and second recessed relief surfaces terminate short of reaching the front edge.

26. The ground engaging tip of claim 25, wherein the first and second recessed relief surfaces and the lower side flanges terminate short of the front edge, such that a chisel is formed by the center rib and the front edge.

27. The ground engaging tip of claim 26, wherein the chisel is wider at the front edge than the center rib.

28. A tooth assembly for an edge of a ground engaging implement, the tooth assembly comprising:

an adapter configured to be coupled to an edge of a ground engaging implement, the adapter including a nose configured to receive a ground engaging tip at an end of the adapter opposite the edge of the ground engaging implement; and a ground engaging tip coupled to the nose of the adapter and including:

a rear edge including an upper rear edge and a lower rear edge;

a front edge opposite the rear edge;

a top outer surface extending from the upper rear edge toward the front edge; and a bottom outer surface extending from the lower rear edge toward the front edge, wherein the bottom outer surface includes:

a bottom surface front portion extending from the front edge toward the lower rear edge and terminating at a bottom surface transition portion, being tangent thereto; and a bottom surface rear portion extending from the bottom surface transition portion toward the lower rear edge and terminating at the lower rear edge, wherein the bottom surface front portion includes a planar front portion surface extending in a first direction, and the bottom surface rear portion includes a planar rear portion surface extending in a second direction, and wherein the first direction and the second direction define an angle, wherein the angle ranges from 181 to 200 degrees.

* * * * *